T. F. SNYDER.
AUTOMOBILE SEAT EXTENSION.
APPLICATION FILED JAN. 13, 1920.
1,342,235.
Patented June 1, 1920.
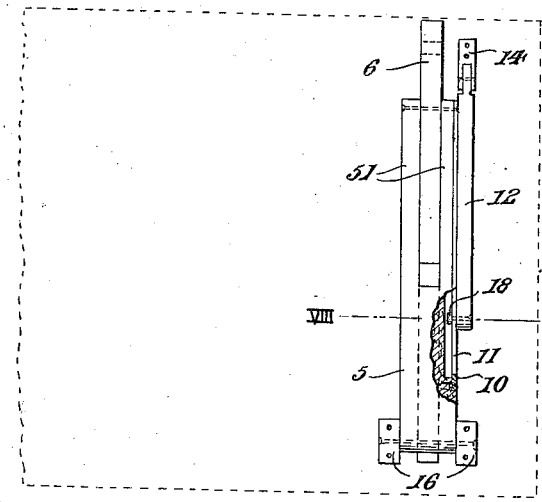
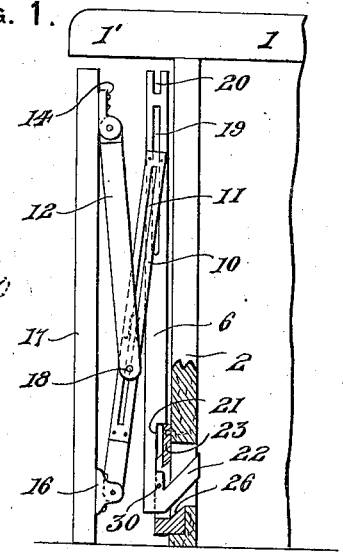
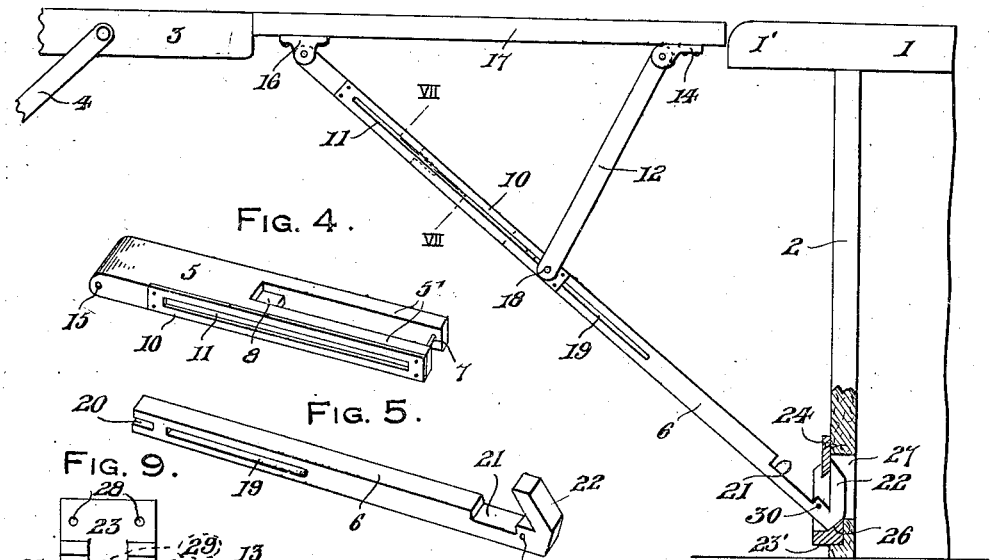
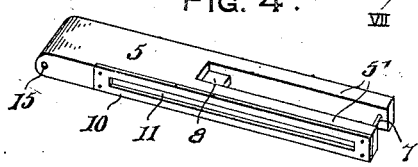
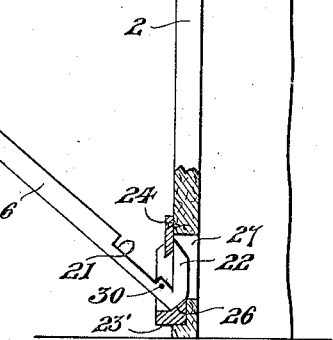
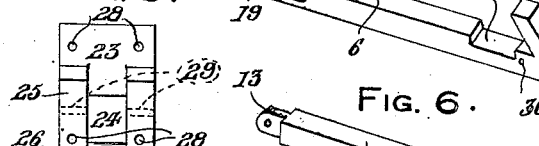
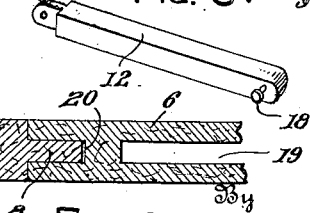
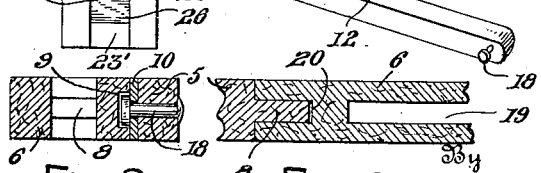
Inventor
T. F. Snyder
By J. D. Bryant
Attorney

UNITED STATES PATENT OFFICE.

THEOPHILUS FRANK SNYDER, OF DELPHOS, OHIO.

AUTOMOBILE-SEAT EXTENSION.

1,342,235.  Specification of Letters Patent.  Patented June 1, 1920.

Application filed January 13, 1920. Serial No. 351,224.

*To all whom it may concern:*

Be it known that I, THEOPHILUS FRANK SNYDER, a citizen of the United States of America, residing at Delphos, in the county of Allen and State of Ohio, have invented certain new and useful Improvements in Automobile-Seat Extensions, of which the following is a specification.

The primary object of the present invention resides in the provision of a seat extension especially designed for use with automobile seats wherein the extension member is alined with the ordinary seat to provide a sleeping couch within an automobile whenever desired.

A further object of the invention is to provide an extension member for the rear seat of an automobile that is particularly designed for use in connection with the construction of device shown, described, and claimed, in patent granted to T. F. Snyder, No. 1,318,930, wherein the back of the front seat is adjustable and is adapted to be lowered into horizontal position so that with the present invention, a continuous member extending from the forward edge of the front seat to the rear edge of the rear seat is provided within the automobile.

With the above and other objects in view, the invention consists in the novel form, combination and arrangement of parts herein fully described and shown in the accompanying drawing, wherein like reference characters indicate similar parts throughout the several views.

In the drawing,

Figure 1 is a fragmentary side elevational view of an automobile seat with a portion of the same shown in section and with the present invention in operative position thereon, Fig. 2 is a front elevational view, partially in section of the supporting bracket for the seat extension, the latter being shown in dotted lines, Fig. 3 is a fragmentary side elevational view showing the seat extension positioned between the front and rear seats with that portion of the rear seat coöperating with the brace for the extension shown in section, Fig. 4 is a perspective view of the upper section of the extension brace, Fig. 5 is a perspective view of the lower section of the extension brace, Fig. 6 is a perspective view of the link connecting the brace to the extension, Fig. 7 is a cross sectional view taken on line VII—VII of Fig. 3, Fig. 8 is a cross sectional view taken on line VIII—VIII of Fig. 2 showing the sliding connection between the extension link and the upper section, and Fig. 9 is a front elevational view of the bracket for supporting the lower end of the brace.

Briefly described, the present invention has for its primary object, the provision of a seat extension for automobiles wherein a foldable extension member is supported upon the heel board of the rear seat of an automobile and is adapted when in its folded inoperative position to be disposed beneath the forward overhanging edge of the seat cushions of the rear seat to occupy a minimum amount of space and to be carried in a manner not to interfere with the foot space between the front and rear seats of an automobile. The back of the front seat being foldable to horizontal position, in line with the front seat bottom, the extension member is adapted to be positioned between the rear edge of the back of the front seat and the forward edge of the rear seat, thus to provide a continuous couch section extending from the front to the rear of the automobile, with said extension member supported upon the heel board of the rear seat and engaging at its forward edge, the rear edge of the front seat back.

Referring more in detail to the accompanying drawing, there is illustrated a portion of the rear seat of an automobile embodying the seat part 1 having a portion 1' overhanging the heel board 2, while the back of the front seat is designated by the reference numeral 3 and is supported when in its collapsed horizontal position as illustrated in Fig. 3 by the brace.

The extension member for the rear seat, bridging the space between the front and rear seats as illustrated in Fig. 3 includes a two-part brace of the form best illustrated in detail in Figs. 3, 4, and 5, the brace embodying an upper section 5 and a lower section 6. The upper section 5 of the brace is bifurcated to provide a pair of legs 5' having a pin 7 extending between the free ends of the legs, while a tongue 8 extends between the bifurcations at the point of connection with the body part 5 and at the upper end of the slot between the bifurcations. One side of the brace section 5 is cut away as shown in Figs. 4 and 8 to provide a longitudinal channel 9 which is covered by a side plate 10 having a longitudinal slot 11 overlying the channel 9 as shown in said figures.

A link 12 of the form best illustrated in Figs. 3 and 6 has a tongue extension 13 for pivotal connection with the bracket 14, while the outer end of the brace section 5 has a transverse opening 15 for the reception of a pivot pin for mounting in the brackets 16, the brackets 14 and 16 carrying an extension board 17 for bridging the space between the front and rear seats 1 and 3, respectively. The inner end of the link 12 carries a headed pin 18 that is slidable in the slot 11 of the brace plate 10 with the head thereof extending into the channel 9 and confining the link to the section 5 as shown in Fig. 8.

The lower section 6 of the two-part brace has a longitudinal slot 19 formed therein and includes the transverse pin 7 at the ends of the legs 5' while the upper terminal end of the lower section 6 is provided with an end opening slot 20 that is adapted to be received on the tongue 8 of the upper section 5 to aline the sections 5 and 6 as illustrated in Fig. 3. The upper face of the inner end of the lower brace section 6 is provided with a cut-away portion 21 while the extreme inner end is provided with an inwardly directed hook projection 22 overlying the cut-away portion 21.

A bracket for pivotally supporting the inner lower end of the brace section 6 is attached to the heel board 2 of the rear seat 1, the bracket embodying a plate 23 shown more clearly in Fig. 9 having a central cutaway portion 24 and side bars 25 of increased thickness while the lower end 23' of the bracket carries a rearwardly directed and upwardly inclined lug projection 26 as shown in Figs. 1 and 3. The heel board 2 is provided with a cut-away portion 27 registering with the opening 24 in the bracket 23, while the bracket is provided with openings 28 to receive hold-fast devices for mounting the bracket 23 upon the heel board. Alined transverse openings 29 are formed in the side bars 25 of the bracket 23 and are adapted to receive a pivot pin that extends through the transverse opening 30 in the lower end of the brace section 6 whereby the brace is pivotally mounted in the bracket 23.

With the seat extension board 17 in its folded collapsed position as illustrated in Fig. 1, the lower brace section 6 is vertically positioned, after having been moved upon its pivotal connection 30 with the heel board 2, while the upper section 5 of the two-part brace has the pin 7 spaced from the outer end of the slot 19 in the brace section 6 while the pin 18 upon the link 12 moves upwardly of the slot 11 in the brace section 5, thus to position the extension board 17 beneath the ledge 1' of the rear seat 1. When it is desired to form a couch section of the front and rear seats of the automobile, the back 3 of the front seat is folded to horizontal position and supported by the brace 4 as illustrated in Fig. 3. The extension board 17 is removed from its resting position upon the floor of the automobile as shown in Fig. 1 to a horizontal position between the rear seat 1 and the front seat back 3, during which movement the link 12 has the pin 18 thereof moved lengthwise of the slot 11 and channel 9 in the upper brace section 5 to the lower end thereof as shown in Fig. 3 and with the brace sections 5 and 6 alined, the slotted end section 6 receives a tongue 8 of the section 5 and with the pin 7 extending through the slot 19 of the section 6, the sections 5 and 6 are locked in alinement as will be obvious. When the parts are thus positioned, the entire extension member is supported upon the pivotal connection 29 and 30 between the brace section 6 and the bracket 23 while the hook projection 22 upon the brace section 6 engaging the rear face of the bracket 23 will limit the forwardly tilting movement of the brace sections and thereby support the board 17 between the front and rear seats of the automobile. While the main support for the seat extension rests upon the brace sections 5 and 6, and the bracket 23, the forward edge of the extension board 17 engaging the rear edge of the front seat back 3 will further brace the extension member at that point. It will therefore be seen that a serviceable seat extension for an automobile is provided so that the two seats of the automobile with the employment of this invention may be converted into a sleeping couch.

While there is herein shown and described, the preferred embodiment of the invention, it is nevertheless to be understood that minor changes may be made in the form, combination and arrangement of parts without departing from the spirit and scope of the invention as hereinafter claimed.

What is claimed as new is:

1. The combination with an automobile seat of an extension member embodying a brace, said brace being formed of extensible sections, interlocking connections between said sections, a board pivoted upon one of said brace sections and a link connection between said brace and board.

2. The combination with an automobile seat of an extension member embodying a two-part brace adapted for rigid connection when alined, pivotal connection between said brace and seat, an extension board pivoted to said brace, said brace having a slotted guide formed therein and a link pivoted to said board and slidable in said guide for maintaining said board in horizontal position.

3. The combination with an automobile seat, of a two-part brace pivotally connected thereto, a pin and slot connection between the two parts of said brace, a tongue and groove connection between the two parts of said brace for maintaining the brace parts rigidly connected in alinement and an extension board pivoted to said brace.

4. The combination with an automobile seat, of a two-part brace pivotally connected thereto, a pin and slot connection between the two parts of said brace, a tongue and groove connection between the two parts of said brace for maintaining the brace parts rigidly connected in alinement, an extension board pivoted to said brace and a link pivotally connected to said extension board and slidably connected to said brace for holding the extension board in horizontal position.

In testimony whereof I affix my signature.

THEOPHILUS FRANK SNYDER.